United States Patent [19]
Kulig et al.

[11] Patent Number: 5,936,167
[45] Date of Patent: Aug. 10, 1999

[54] DOOR ASSEMBLY TESTINGS SIMULATOR

[75] Inventors: Richard C. Kulig, Orion; Louis J. Rich, Shelby Township; Frank A. Mulso, Rochester Hills; Athar Shah, Madison Heights; Robert Snyder, Metamore; Gordon E. Segal, Livonia; John L. Romanik, Roseville; James K. Rafferty, Lapeer, all of Mich.

[73] Assignee: Chrysler Corporation, Auburn Hills, Mich.

[21] Appl. No.: 09/037,448

[22] Filed: Mar. 10, 1998

[51] Int. Cl.⁶ .............................. G01N 3/30; G01N 19/00
[52] U.S. Cl. .......................................... 73/865.6; 73/865.9
[58] Field of Search .................................. 73/808, 865.6, 73/865.9

[56] References Cited

U.S. PATENT DOCUMENTS

| | | |
|---|---|---|
| 4,278,244 | 7/1981 | Carter . |
| 4,449,393 | 5/1984 | Tucker et al. . |
| 4,486,180 | 12/1984 | Riley .......................................... 434/65 |
| 4,636,136 | 1/1987 | Nomura et al. . |
| 5,481,266 | 1/1996 | Davis ........................................ 324/28 |
| 5,483,845 | 1/1996 | Stein et al. ............................. 73/865.3 |
| 5,633,626 | 5/1997 | Cawthorne .............................. 340/545 |
| 5,641,918 | 6/1997 | Odenwald . |

Primary Examiner—Max Noori
Attorney, Agent, or Firm—Roland A. Fuller III

[57] ABSTRACT

A simulator device for simulating the signature characteristics of a vehicle is provided which has a support structure to operably support a door assembly of a vehicle. A door actuating assembly is adjustably mounted to the support structure to operate the vehicle door assembly systems. The simulator device thereby cyclic tests the door assembly without the need for the door assembly to be installed on the vehicle.

19 Claims, 7 Drawing Sheets

DOOR ASSEMBLY TESTINGS SIMULATOR

BACKGROUND OF THE INVENTION

FIELD OF THE INVENTION

The present invention relates to improved vehicle production methods and, more particularly, to an apparatus for cyclic testing a complete vehicle door assembly as though the door assembly was on the vehicle.

BACKGROUND AND SUMMARY OF THE INVENTION

During the manufacturing process, especially during prototyping and early production phases of development of a new motor vehicle, it is commonly necessary to cycle test various functional aspects of the vehicle, such as the operation of the door assembly. Typically, such functional cyclic testing involves outfitting at least one prototype version of the vehicle with custom linkages and supports throughout its passenger compartment. This outfitting enables automated operation of the vehicle door assembly.

However, this prior method of testing inherently contains numerous drawbacks. Firstly, the prior method requires the use of a prototype vehicle for extended periods of time. Such extended use of the vehicle is necessary because of the custom testing structure which must be designed, constructed, and installed within the prototype vehicle's passenger compartment. The custom testing structure for the door assembly includes individual, uniquely-designed linkages and structural supports assembled within the vehicle to operate each door assembly (e.g. door, door handles, door locks, windows, etc.). Because of this excessive outfitting of testing linkages within the prototype vehicle, testing teams must typically have the prototype vehicle for several months.

Secondly, the prior method requires enormous capital expenditure to conduct the tests. As described above, the testing team must have complete access to the prototype vehicle for several months. Consequently, additional prototype vehicles must be constructed to allow simultaneous testing of other mechanical systems of the vehicle. Simultaneous testing insures timely design, testing and manufacture of new vehicles. Prototype vehicles typically cost approximately two (2) million dollars each.

It is therefore desirable to provide a simulator device capable of cyclic testing a vehicle door assembly as though it was operably installed on a vehicle. Furthermore, it is desirable that the simulator device minimize the testing cost and the time required for setting up the testing structure, without sacrificing reliable test results. It is still further desirable to minimize the space required to conduct such vehicle door assembly testing.

According to a preferred embodiment of the present invention, a simulator device is provided which has a support structure to operably support a door assembly of a vehicle. A door actuating assembly is adjustably mounted to the support structure to operate the vehicle door assembly systems. Thus, the simulator device simulates the signature characteristics (e.g. door seal load, vehicle suspension recoil, cabin pressure, vehicle body flex, etc.) of the vehicle. Accordingly, the simulator enables reliable cyclic testing of the door assembly without the need for the door assembly to be operably installed on the vehicle.

According to a more preferred embodiment of the present invention, the support structure includes a cart portion with a plurality of casters. A hinge header assembly, a latch plate assembly, and a plurality of support bars are mounted to the cart portion. The cart portion includes a recess portion to receive a plurality of weights. The plurality of weights enable the simulator device to simulate the load characteristics of the vehicle. Similarly, the plurality of casters are preferably swivel casters with pneumatically-filled rubber tires. The tires are capable of reproducing the oscillating or recoil signature of the vehicle's suspension and wheel assemblies.

According to a still more preferred embodiment, the hinge header assembly includes a hinge header support mounted to the cart portion. At least one hinge block is included to retain the hinge of the door assembly. Preferably, the hinge block is machined to match the contour of the vehicle. The machining enables accurate positioning of the door assembly relative the simulator device. The latch plate assembly includes a latch support mounted to the cart portion. A striker bracket is secured to the latch support. The latch support includes a plurality of slots to facilitate adjustment of the striker plate relative to the door assembly. The striker plate supports a latch. The latch operably engages the latch receiving mechanism of the door assembly.

According to an even more preferred embodiment, the simulator device includes a support header mounted to the cart portion. The support header further supports the plurality of support bars. Lastly, a plurality of door seal supports are mounted to the support bars. The plurality of door seal supports simulate the door seal load and cabin pressure of the vehicle acting upon the door assembly.

Further areas of applicability of the present invention will become apparent from the detailed description provided hereinafter. It should be understood however that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
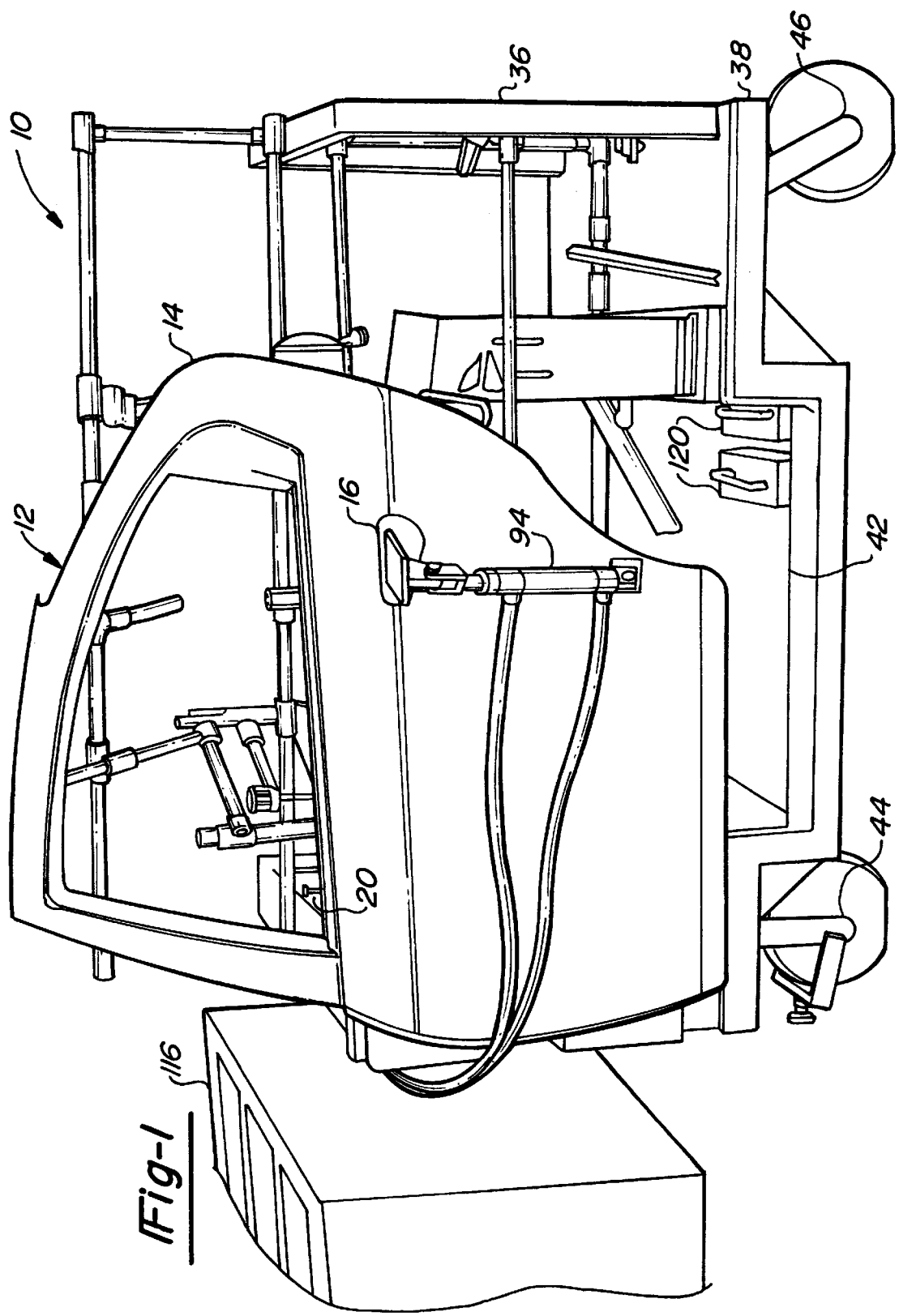
FIG. 1 is a perspective view of a door assembly shown mounted to a simulator device according to the present invention.

The following description of the preferred embodiment is merely exemplary in nature and is in no way intended to limit the invention, its application, or uses.

Referring to the drawings, a test fixture or simulator device 10 is shown for cyclic testing of a door assembly 12 of a prototype vehicle (not shown). Door assembly 12 includes a vehicle door 14, an exterior door handle 16, a window handle 18, a door lock 20, an interior door surface 22, a latch receiving mechanism 24, and at least one hinge 26. The specific operation of these elements will be described in detail below.

Figure 2:
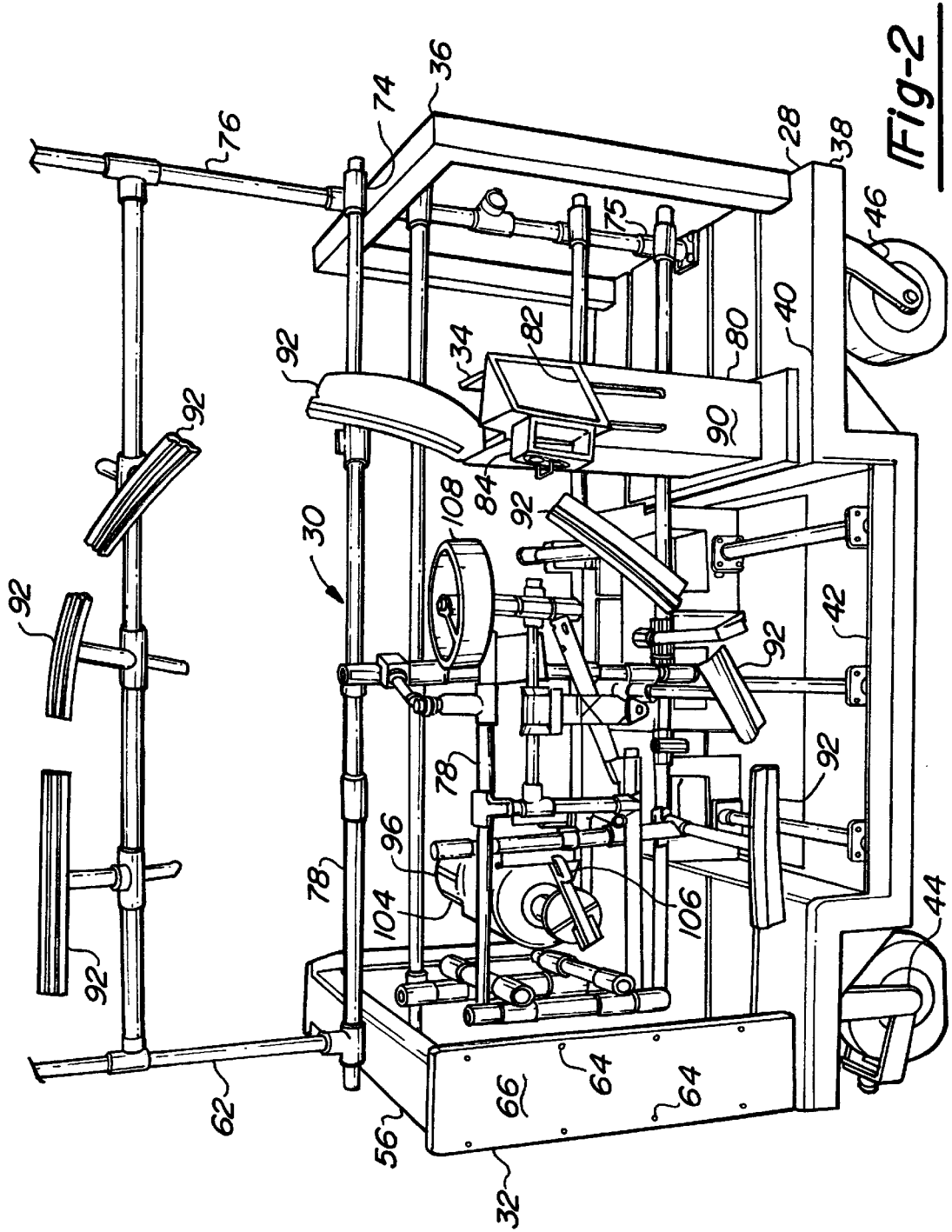
FIG. 2 is a front perspective view of the simulator device.

As best seen in FIG. 2, simulator device 10 includes a support structure 28 and a door actuating assembly 30. Support structure 28 generally includes a hinge header assembly 32, a latch plate assembly 34, a support header 36 mounted to a base assembly 38.

In greater detail, base assembly 38 includes a cart portion 40 having a cart recess 42. A pair of front casters 44 and a pair of rear casters 46 are further mounted to cart portion 40. Preferably, front casters 44 and rear casters 46 are swivel-type casters with pneumatically-filled rubber tires to simulate the oscillating signature of the vehicle. However, it is anticipated that any caster or wheel assembly may be used, which is able to simulate the oscillating signature caused by the tires and suspension system of the vehicle.

Figure 4:
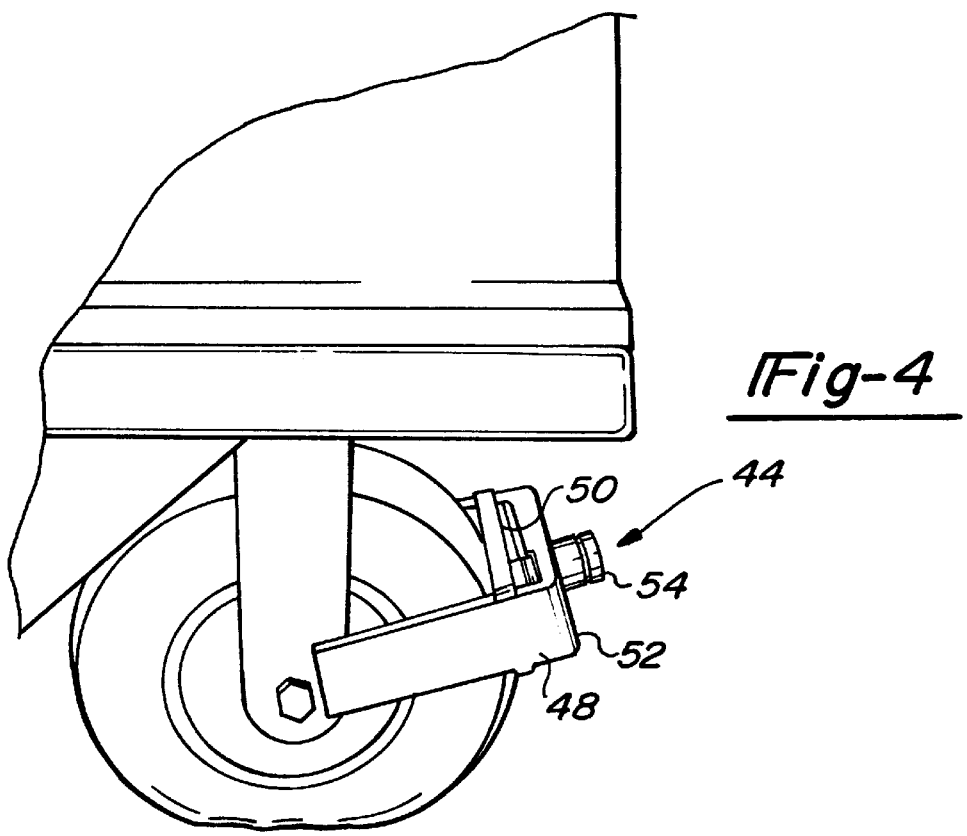
FIG. 4 is an exploded perspective view of the brake retaining system of the simulator device.

As best seen in FIG. 4, front casters 44 further include brakes 48. Brakes 48 prevent movement of simulator device 10 during the test procedure. Each brake 48 employs a brake pad 50, a U-shaped brake arm 52, and a set screw 54. Brake pad 50 is slidably engaged with U-shaped brake arm 52. Rotation of set screw 54 causes brake pad 50 to slide along U-shaped brake arm 52 and contact front caster 44, thereby frictionally preventing movement of simulator device 10.

Figure 3:
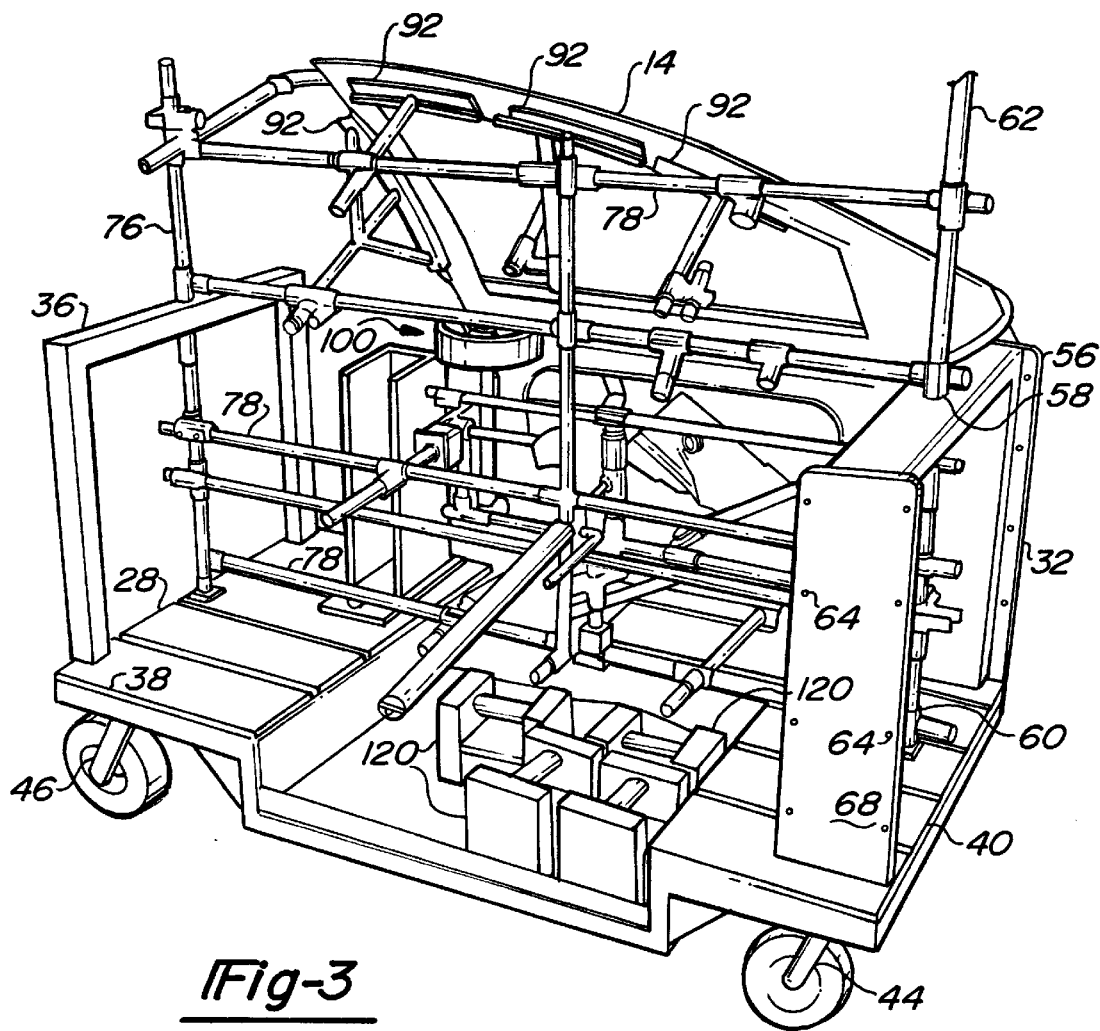
FIG. 3 is a rear perspective view of the door assembly mounted to the simulator device.
Figure 10:
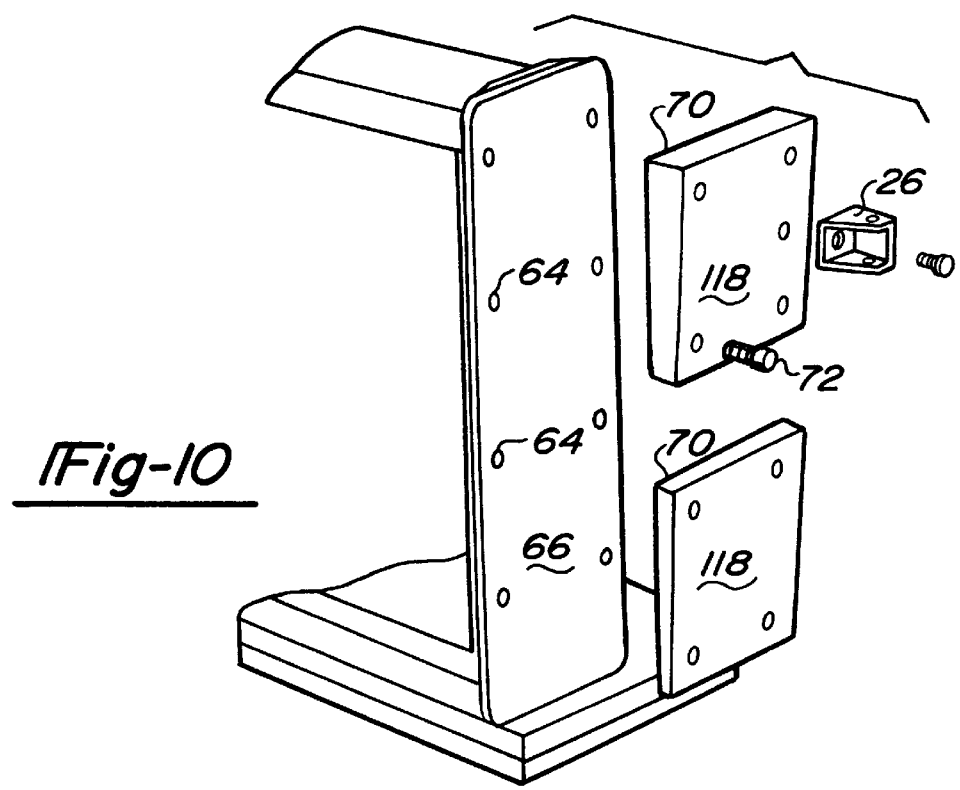
FIG. 10 is an exploded perspective view of the hinge header assembly according to the present invention.

Referring to FIGS. 2, 3, 6, and 10, hinge header assembly 32 is shown having a hinge header 56 welded to cart portion 40. As best seen in FIG. 3, hinge header 56 provides apertures 58, 60 to receive a vertical support bar 62. Hinge header 56 further provides a plurality of threaded apertures 64 disposed along sides 66, 68 of hinge header 56. As is best seen in FIG. 10, at least one hinge block 70 is shown secured to side 66 of hinge header 56 using fasteners 72 received within threaded apertures 64.

Still referring to FIGS. 2 and 3, support header 36 is shown welded to cart portion 40. As best seen in FIG. 2, support header 36 includes an apertures 74, 75 to receive a vertical support bar 76. Vertical support bars 62, 76 provide a framework to which a plurality of support bars 78 is attached and supported. Support header 36 further provides structural rigidity to simulator device 10 by minimizing structural flex of base assembly 38.

Figure 9:
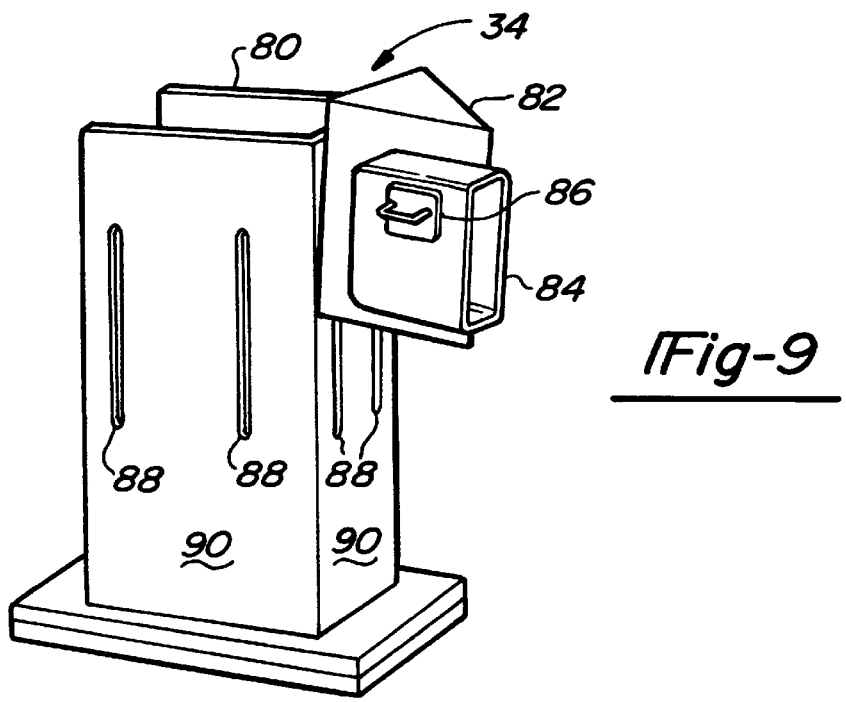
FIG. 9 is a perspective view of the latch plate assembly of the simulator device.

Referring to FIGS. 2 and 9, latch plate assembly 34 is shown having a latch support 80, a striker bracket 82, a latch extension 84, and a latch 86. Specifically, latch support 80 includes a pair of slots 88 disposed along vertical sides 90. Striker bracket 82 is vertically adjusted along slots 88 to accommodate various positions of latch receiving mechanism 28 of door assembly 12. Latch extension 84 is shown mounted to striker bracket 82 to properly align latch 86 relative to latch receiving mechanism 28. It is anticipated, however, that latch extension 84 may be removed from simulator device 10 to accommodate various door profiles.

Referring to FIGS. 2 and 3, simulator device 10 further includes a plurality of seal supports 92. Seal supports 92 are adjustably secured to support bars 78. Seal supports 92 are further disposed along a peripheral edge of vehicle door 14 to simulate the load produced by the door seals acting upon the periphery of vehicle's door. Furthermore, seal supports 92 simulate the cabin pressure produced by the vehicle during closure of the door.

Figure 6:
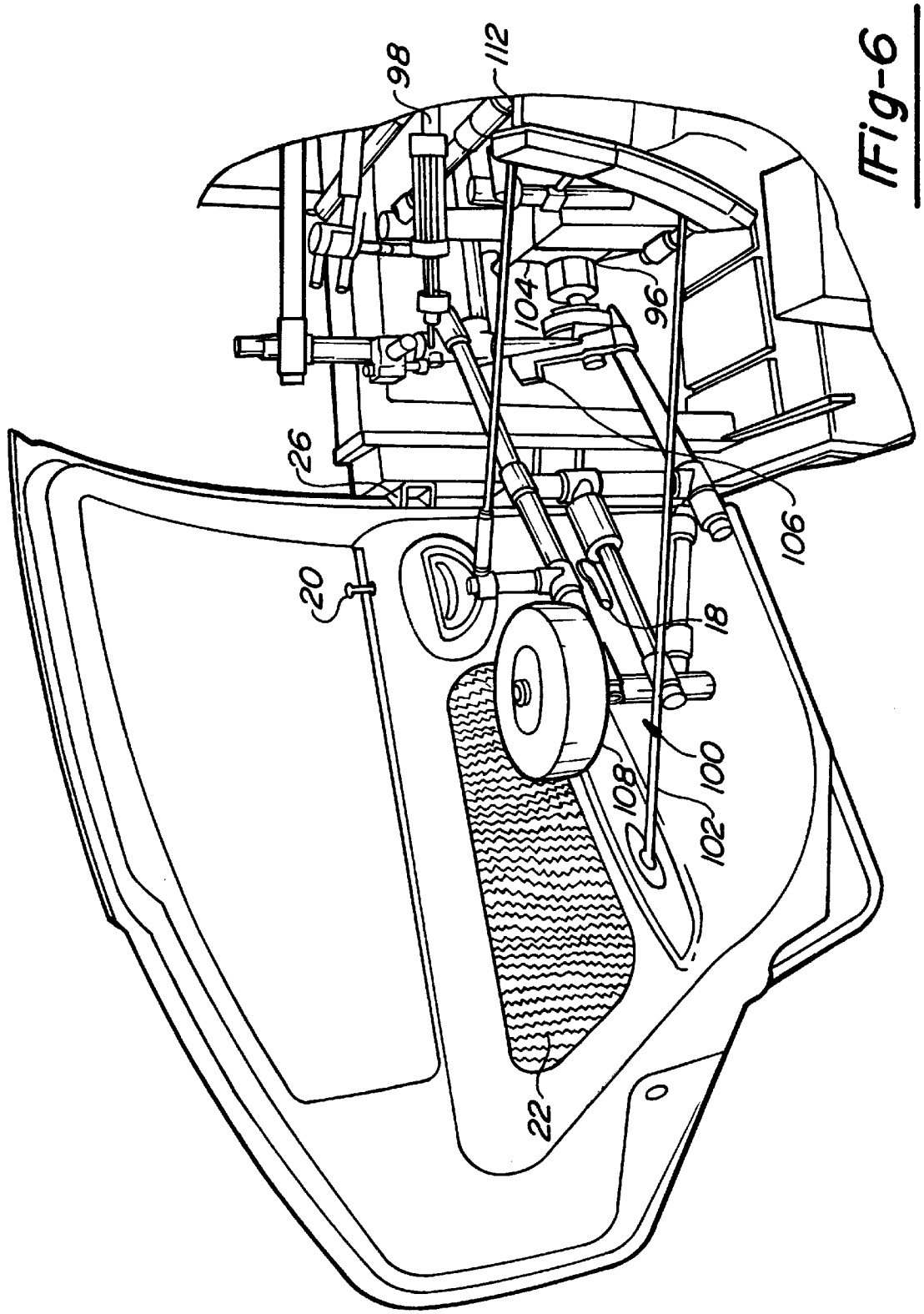
FIG. 6 is an exploded perspective view of the simulator device actuating the door assembly.
Figure 7:
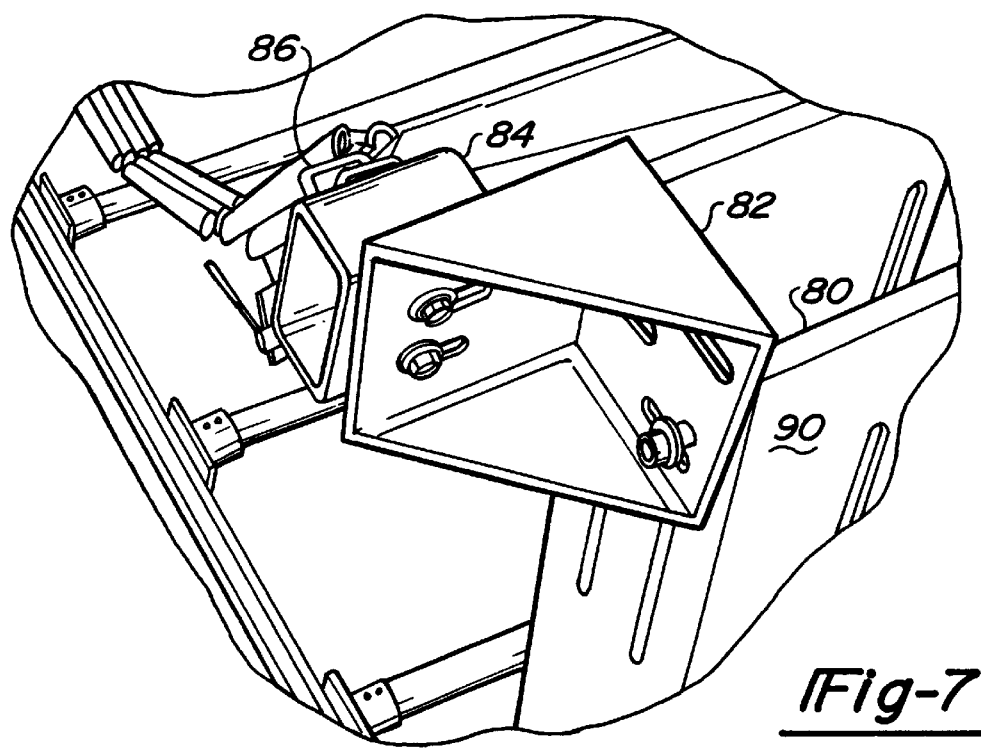
FIG. 7 is a perspective view of the latch plate assembly of the simulator device.
Figure 8:
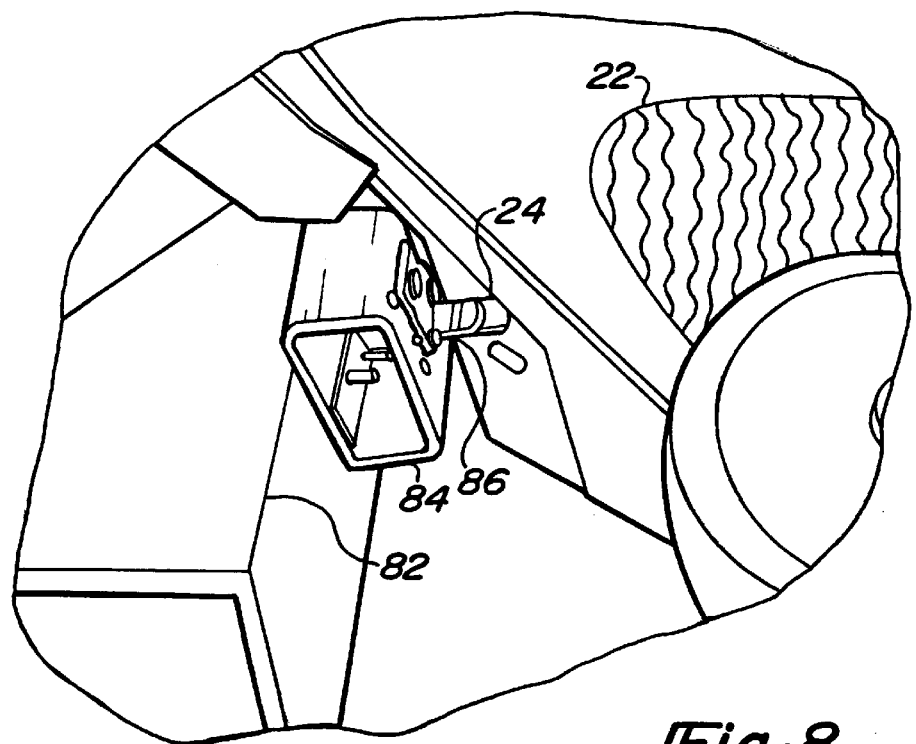
FIG. 8 is a rear perspective view of the latch plate assembly similar to FIG. 7.

As noted, simulator device 10 includes door actuating assembly 30. Door actuating assembly 30 includes a door handle actuator 94, a window actuator 96, a door lock manipulator 98, door opening means 100, and a door retractor arm 102. Door handle actuator 94 is fixedly secured to vehicle door 14 to automatically actuate exterior door handle 16. As best seen in FIGS. 2 and 6, window actuator 96 comprises a rotary motor 104. Rotary motor 104 rotatably operates a window handle member 106 which in turn rotatably operates window handle 18. Door opening means 100 includes a roller 108, a pivot arm 110, and an opening actuator 112. Roller 108 is rotatably fixed to an end of pivot arm 110. Pivot arm 110 is pivotably connected to support bars 78. Opening actuator 112 is rigidly secured to support bars 78 and, further, pivotably connected to pivot arm 110. Thus, opening actuator 112 actuates so as to pivot pivot arm 110. In turn, pivot arm 110 forces roller 108 into contact with interior door surface 22 of vehicle door 14, thereby opening door 14. Door retractor arm 102 is fixed to vehicle door 14 for closing vehicle door 14.

Figure 5:
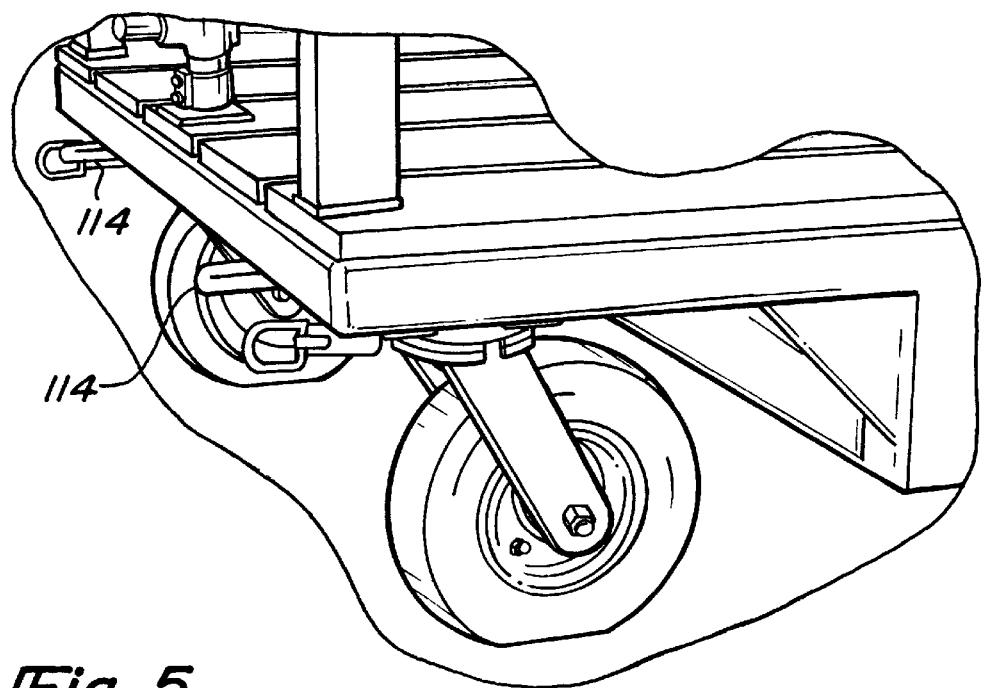
FIG. 5 is an exploded perspective view of the towing means of the simulator device.

Referring to FIG. 5, simulator device 10 still further includes a pair of towing loops 114 to facilitate convenient relocation of the testing fixture. Such relocation is commonly necessary to test door assembly 12 in varying environmental conditions.

In order to properly calibrate simulator device 10 to simulate the signature characteristics (e.g. door seal load, vehicle suspension recoil, cabin pressure, vehicle body flex, etc.) of the prototype vehicle, it is first necessary to acquire initial calibration values. To this end, a data acquisition system 116, including accelerometers (not shown) and angle measuring transducers (not shown), is attached to door assembly 12 while door assembly 12 is operably installed on the prototype vehicle. Data acquisition system 116 accurately measures the acceleration, seal load, and velocity (for door slam closing) values of door assembly 12 to establish base values for later calibration of simulator device 10.

Door assembly 12 is then operably mounted to simulator device 10 by fastening door hinge 26 to hinge block 70 of hinge header assembly 32. As seen in FIG. 10, hinge block 70 includes a contoured surface 118 for simulating the contour of a vehicle pillar. Contoured surface 118 allows more accurate orientation of door assembly 12 relative to simulator device 10. Latch 86 and striker bracket 82 are then positioned to operably interconnect latch 86 with latch receiving mechanism 28.

Door handle actuator 94, window actuator 96, and door lock manipulator 98 are then positioned to operably engage exterior door handle 16, window handle 18, and door lock 20, respectively. To prevent movement of simulator device 10, brake pads 50 are deployed to frictionally engage front casters 44.

To correctly calibrate simulator device 10, door assembly 12 is installed on support structure 28. Data acquisition system 116, including accelerometers and angle measuring transducers, is then operably connected to door assembly 12.

Door actuating assembly 30 is actuated to produce present calibration values. Specifically, actuation of door actuator assembly 30 comprises the steps of:

(a) door lock manipulator 98 unlocking door lock 20;

(b) opening actuator 112 pivoting pivot arm 110 and roller 108 into contact with interior door surface 22; while simultaneously, door handle actuator 94 raises exterior door handle 16 into an unlocked position;

(c) roller 108 moving vehicle door 14 to a fully opened position;

(d) pivot arm 110 retracting roller 108 to enable door retractor arm 102 to retract vehicle door 14 into a fully closed position; and (e) rotary motor 104 of window actuator 96 rotating window handle member 106 to, in turn, rotate window handle 18 of vehicle door 14, thereby lowering and raising a window of vehicle door 14.

Following a complete, or partial cycle (e.g. steps (a)–(d)), data is collected from the accelerometers and angle measuring transducers to compared to the above-described initial calibration values obtained when door assembly 12 was operably install on the vehicle. Simulator device 10 is then calibrated to approximate the initial calibration values. To this end, weights 120 are placed in cart recess 42 to establish proper weight distribution of support structure 28. Furthermore, seal supports 92 are adjusted to accurately simulate the prototype vehicle's door seal and cabin pressure loads exerted on the door assembly 12. Lastly, casters 44, 46 are deflated to provide accurate representation of the vehicle's suspension and tire assemblies' oscillating signature. Once a true representation of the prototype vehicle's initial calibration values is achieved, data acquisition system 116 is disconnected from door assembly 12. Simulator device 10 is thus calibrated to allow quick, convenient, and accurate cyclic testing of door assembly 12.

The present invention, therefore, provides reliable testing of a door assembly of a vehicle while minimizing the capital expenditure required. Furthermore, the present invention improves testing times by eliminating the need to design, construct, and install a custom testing structure within the prototype vehicle's passenger compartment. Without intending to be limited by example, testing times have been found to be approximately two (2) weeks, rather than approximately three (3) months as is common with the prior method. The present invention still further provides improved maneuverability of the testing fixture for convenient transportation to various testing environments (e.g. hot-test lab, cold-test lab, etc).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A simulator device for testing a door assembly of a vehicle, said simulator device comprising:

a support structure for operably supporting the door assembly of the vehicle; and a door actuating assembly being adjustably mounted to said support structure and further being operably mounted to the door assembly for actuating the door assembly, whereby the simulator device simulates the signature characteristics of the vehicle to enable cyclic testing of the door assembly without the need for the door assembly to be operably installed on the vehicle.

2. The simulator device according to claim 1 wherein said support structure comprises:

a cart portion having a top portion and a bottom portion;

a plurality of casters being operably mounted to said bottom portion of said cart;

a hinge header assembly being mounted to said top portion of said cart, said hinge header assembly supporting at least one hinge of the door assembly;

a latch plate assembly being mounted to said top portion of said cart for supporting a latch of the door assembly; and a plurality of support bars being adjustably mounted to said hinge header assembly, wherein said door actuating assembly is removably secured to said plurality of support bars.

3. The simulator device according to claim 2 wherein said cart portion includes a recess portion for receiving a plurality of weights.

4. The simulator device according to claim 2 wherein said plurality of casters are swivel casters having pneumatically-filled rubber tires for simulating the oscillating signature of the vehicle.

5. The simulator device according to claim 2 wherein said hinge header assembly comprises:

a hinge header support being mounted to said top portion of said cart;

at least one hinge block being removably secured to at least one side of said hinge header support for retaining said at least one hinge of the door assembly.

6. The simulator device according to claim 5 wherein said hinge block further comprises:

at least one contoured side for simulating the orientation of said at least one hinge as though it was on the vehicle.

7. The simulator device according to claim 2 wherein said latch plate assembly comprises:

a latch support being mounted to said top portion of said cart, said latch support having a plurality of slots;

a striker bracket for supporting said latch of the vehicle, said striker bracket being removably mounted to said plurality of slots of said latch support, thereby facilitating adjustment of said striker bracket relative to the door assembly.

8. The simulator device according to claim 2 wherein said door actuating assembly comprises:

a door handle actuator being removably secured to an outer surface of the door assembly, said door handle actuator operably actuating a door handle of the door assembly;

a window actuator being adjustably supported by said plurality of support bars for operating a window of the door assembly;

a door lock manipulator being adjustably supported by said plurality of support bars for operating a door lock of the door assembly;

door opening means being adjustably supported by said plurality of support bars for operating moving said door assembly into an opened position; and a door retractor being adjustably supported by said plurality of support bars for operating moving said door assembly into a closed position.

9. The simulator device according to claim 8 wherein said door opening means comprises:

an opening actuator being adjustably secured to said plurality of support bars;

a pivot arm being pivotably fixed to said plurality of support bars, said pivot arm further being rotatably secured to said opening actuator; and a roller for operably engaging an interior surface of the door assembly being rotatably secured to an end of said pivot arm.

10. The simulator device according to claim 2, further comprising:

a header for improved structural integrity of said simulator device being mounted to said top portion of said cart portion, said header further supporting said plurality of support bars; and a plurality of door seal supports for simulating seal load upon the door assembly, said plurality of door seal supports being adjustably mounted to said plurality of support bars.

11. A testing fixture for testing a door assembly of a vehicle, said testing fixture comprising:

a base assembly;

a hinge header assembly being mounted to said base assembly, said hinge header assembly supporting at least one hinge of the door assembly;

a latch plate assembly being mounted to said base assembly for supporting a latch of the door assembly; and a door actuating assembly being adjustably mounted to said base assembly and further being operably mounted to the door assembly for operating the door assembly, whereby the testing fixture simulates the signature characteristics of the vehicle to enable cyclic testing of the door assembly without the need for the door assembly to be operably installed on the vehicle.

12. The testing fixture according to claim 11 wherein said base assembly comprises:

cart portion having a top portion and a bottom portion; and a plurality of casters being operably mounted to said bottom portion of said cart; and a plurality of support bars being adjustably mounted to said hinge header assembly, wherein said door actuating assembly is removably secured to said plurality of support bars.

13. The testing fixture according to claim 12 wherein said cart portion includes a recess portion for receiving a plurality of weights.

14. The testing fixture according to claim 12 wherein said plurality of casters are swivel casters having pneumatically-filled rubber tires for simulating the oscillating signature of the vehicle.

15. The testing fixture according to claim 11 wherein said hinge header assembly comprises:

a hinge header support being mounted to said base assembly;

at least one hinge block being removably secured to at least one side of said hinge header support for retaining said at least one hinge of the door assembly.

16. The testing fixture according to claim 15 wherein said hinge block further comprises:

at least one contoured side for simulating the orientation of said at least one hinge as though it was on the vehicle.

17. The testing fixture according to claim 11 wherein said latch plate assembly comprises:

a latch support being mounted to said base assembly, said latch support having a plurality of slots;

a striker bracket for supporting said latch of the vehicle, said striker bracket being removably mounted to said plurality of slots of said latch support, thereby facilitating adjustment of said striker bracket relative to the door assembly.

18. The testing fixture according to claim 11 wherein said door actuating assembly comprises:

a door handle actuator being removably secured to an outer surface of the door assembly, said door handle actuator operably actuating a door handle of the door assembly;

a window actuator being adjustably supported by said plurality of support bars for operating a window of the door assembly;

a door lock manipulator being adjustably supported by said plurality of support bars for operating a door lock of the door assembly;

door opening means being adjustably supported by said plurality of support bars for operating moving said door assembly into an opened position;

an opening actuator being adjustably secured to said plurality of support bars;

a pivot arm being pivotably fixed to said plurality of support bars, said pivot arm further being rotatably secured to said opening actuator;

a roller for operably engaging an interior surface of the door assembly being rotatably secured to an end of said pivot arm; and a door retractor being adjustably supported by said plurality of support bars for operating moving said door assembly into a closed position.

19. The testing fixture according to claim 11 further comprising:

a header for improved structural integrity of the testing fixture being mounted to said base assembly, said header further supporting said plurality of support bars; and a plurality of door seal supports for simulating seal load upon the door assembly, said plurality of door seal supports being adjustably mounted to said plurality of support bars.

* * * * *